United States Patent [19]
Hohmann et al.

[11] 3,818,052
[45] June 18, 1974

[54] PROCESS FOR ISOLATING 1,5-AND 1,8-DINITRO-ANTHRAQUINONE FROM ANTHRAQUINONE NITRATION MIXTURES

[75] Inventors: Walter Hohmann; Heinz Scheiter, both of Leverkusen, Germany

[73] Assignee: Bayer Aktiengesellschaft, Leverkusen, Germany

[22] Filed: Aug. 28, 1972

[21] Appl. No.: 284,057

[30] Foreign Application Priority Data
Aug. 28, 1971   Germany............................ 2143253

[52] U.S. Cl............................... 260/369, 260/378
[51] Int. Cl................................................. C09b 1/00
[58] Field of Search.................................... 260/369

[56] References Cited
OTHER PUBLICATIONS
Hefti, Helv. Chim. Acta. 14, pp 1404–27 (1931).

Primary Examiner—Lorraine A. Weinberger
Assistant Examiner—E. Jane Skelly
Attorney, Agent, or Firm—Plumley & Tyner

[57] ABSTRACT

Process for the manufacture of 1,5-dinitro-anthraquinone and 1,8-dinitro-anthraquinone of a high degree of purity, characterized by nitration of anthraquinone in sulphuric acid and isolation of 1,5-dinitro-anthraquinone from the reaction mixture by adjusting to an $SO_3$-content of 8 – 20 percent and subsequently isolating 1,8-dinitroanthraquinone from the mother liquor by adjusting to a sulphuric acid content of 80 – 100 percent.

4 Claims, No Drawings

PROCESS FOR ISOLATING 1,5-AND 1,8-DINITRO-ANTHRAQUINONE FROM ANTHRAQUINONE NITRATION MIXTURES

It is known from German Pat. Spec. Nos. 167,699 and 72,685 to separate the mixture of 1,5- and 1,8-dinitro-anthraquinone which is produced on treatment of anthraquinone with nitrating acid (= a mixture of nitric acid and sulphuric acid) under warm conditions, and which is essentially contaminated with 1,6- and 1,7-dinitro-anthraquinone, by recrystallisation from organic solvents.

Since, before the recrystallisation, the dinitro-anthraquinones have to be isolated from the sulphuric acid and dried, a two-stage process is necessary. Additionally, the recrystallisation from organic solvents represents an expensive process step.

It has now been found that 1,5- and 1,8-dinitro-anthraquinone of a high degree of purity and practically free of 1,6- and 1,7-dinitro-anthraquinone can be isolated directly in the course of working-up the nitration melt if either, from the start, the nitration is carried out in such highly concentrated oleum, or so much highly concentrated oleum is added during or after the nitration, that at the end an oleum containing 8 – 20 percent, preferably 10 – 17 percent, of $SO_3$ is present. By filtration at room temperature or elevated temperature, preferably at 50° – 90°C, a first fraction which contains 85 – 90 percent of 1,5-dinitro-anthraquinone is obtained, whilst dilution of the mother liquor to 80 – 100 percent strength acid, preferably approx. 92 – 100 percent strength acid, gives a further fraction which contains 80 – 90 percent of 1,8-dinitro-anthraquinone. Both fractions are practically free of 1,6- and 1,7-dinitro-anthraquinone. If no value is attached to separating the 1,6- and 1,7-dinitro-anthraquinone from the 1,8-dinitro-anthraquinone, a higher yield of 1,8-dinitro-anthraquinone of lower quality can be obtained from the mother liquor by further addition of water. This result is surprising since the solubility of the 1,5- and 1,8-dinitro-anthraquinone in anhydrous sulphuric acid is too low for a separation, whilst the instability of dinitro-anthraquinones towards oleum has been known for a long time (see, inter alia, German Pat. Nos. 67,102 and 71,435). Thus, 1,5-dinitro-anthraquinone cannot be dissolved in oleum of any desired $SO_3$ concentration without it undergoing decomposition. The conditions which have been discovered are limiting conditions, under which the decomposition of the dinitro-anthraquinones admittedly already takes place to a slight extent but remains within tolerable limits whilst pure 1,8-dinitro-anthraquinone is already completely dissolved.

Thus it proves possible to dissolve the 1,8-dinitro-anthraquinone completely out of a mechanical mixture of the pure components, so that the residue which remains is pure 1,5-dinitro-anthraquinone, as is described in Example 7 of this application. The fact that the 1,8-component is not completely dissolved out in the reaction mixture is very probably attributable to mixed crystal formation between 1,5-and 1,8-dinitro-anthraquinone. A separation by fractionation is not possible because of the insolubility of the 1,5-dinitro-anthraquinone component in oleum if an economically acceptable ratio of dinitro-anthraquinone/solvent is used. After completion of the nitration and before addition of the 65 percent strength oleum, excess nitric acid can be eliminated by adding to the nitration mixture a compound which can easily be nitrated, for example p-toluidine, or reducing substances, for example hydrazine hydrate, but this does not result in any significantly higher yields or better qualities.

Thus, in all cases, an 85 – 90 percent strength 1,5- and 1,8 -dinitro-anthraquinone is obtained which is in all cases contaminated with 8 – 15 percent of the other component. From a 1,5-dinitro-anthraquinone obtained in this way it is for example possible, by reduction in accordance with known procedures, for example with sodium sulphide, to obtain 1,5-diamino-anthraquinone, an important industrial intermediate product for many commercially available dyestuffs, which is hitherto manufactured from anthraquinone-1,5-disulphonic acid by mashing with ammonia — in a quality which allows the material to be used, without requiring an additional purification, for manufacturing in a known manner, in good yield and conforming to type, commercially available dyestuffs such as are listed, for example, in the Colour Index under the numbers 65,405, 65,415, 69,015, 69,025 or 70,510 or as Vat Green 32. On the other hand, the same dyestuffs are not obtainable at all, or only obtainable in completely inadequate yields, from the unseparated mixture of 1,5- and 1,8-dinitro-anthraquinone.

In the separation according to the invention, depending on the experimental conditions chosen, 85 – 95 percent of the 1,5- and 1,8-dinitro-anthraquinone which were present in the reaction mixture are isolated in the 1,5- and 1,8- fraction.

Accordingly, the subject of the invention is a process for the manufacture of 1,5-dinitro-anthraquinone and 1,8-dinitro-anthraquinone of a high degree of purity, especially a process for the manufacture of at least 80 percent strength 1,5-dinitro-anthraquinone, which contains 1,8-dinitro-anthraquinone as the significant impurity but is practically free of 1,6-and 1,7-dinitro-anthraquinone, and a process for the manufacture of at least 80% strength 1,8-dinitro-anthraquinone which contains 1,5-dinitro-anthraquinone as the significant impurity, but is practically free of 1,6- and 1,7-dinitro-anthraquinone, and which consists of nitrating anthraquinone in a manner which is in itself known in mixtures of nitric acid and sulphuric acid at elevated temperature, subsequently adjusting the reaction mixture to an $SO_3$ content of 8 – 20 percent, preferably 10 – 17 percent, separating off, if appropriate after warming to about 50° – 90°C, the undissolved 1,5-dinitro-anthraquinone by filtration and separating out the 1,8-dinitro-anthraquinone from the mother liquor by diluting to an acid content of about 80 – 100 percent, preferably about 92 – 100 percent.

The process can also be modified in the sense that the nitration of the anthraquinone in sulphuric acid is already carried out at such an $SO_3$ content that after the nitration a nitration mixture with an $SO_3$ content of 8 – 20 percent is present and that after removal of the insoluble 1,5-dinitro-anthraquinone the residue is diluted to a sulphuric acid content of about 80 – 100 percent, preferably 92 – 100 percent, in order to separate off the 1,8-dinitro-anthraquinone.

Separation of mixtures which contain 1,5-dinitro-anthraquinone and 1,8-dinitro-anthraquinone or consist of the two components, into 1,5-dinitro-anthraquinone with a degree of purity of at least 80 percent, which contains 1,8-dinitro-anthraquinone as the significant impurity, but is practically free of 1,6- and 1,7-dinitro-anthraquinone, and 1,8-dinitro-anthraquinone of a degree of purity of at least 80 percent which contains 1,5-dinitro-anthraquinone as the significant impurity but is practically free of 1,6- and 1,7-dinitro-anthraquinone, which is characterised in that the mixtures are treated, at room temperature or elevated temperature, preferably about 50° – 90°C, with sulphuric acid of an $SO_3$ content of 8 – 20 percent, preferably with a four to 10-fold amount, the undissolved 1,5-dinitro-anthraquinone is separated off by filtration and the 1,8-dinitro-anthraquinone is precipitated from the mother liquors by dilution to a sulphuric acid concentration of about 80 – 100 percent, preferably 92 – 100 percent.

Unless otherwise stated, the percentage data are percentages by weight.

The quality data in the examples are based on quantitative column chromatography.

EXAMPLE 1

225 g of anthraquinone (99 percent strength) are dissolved in 470 ml of cold 20 percent strength oleum and 300 ml of a nitration acid which consists of 33 percent of nitric acid and of 67 percent of anhydrous sulphuric acid are added dropwise at a uniform speed over the course of 3 hours to this solution, at below 50°C. The mixture is then warmed to 95°C over the course of 1 hour, whilst stirring, and is kept at this temperature until no anthraquinone and no 1-nitro-anthraquinone are any longer detectable in a sample, and is stirred until cold and then stirred for a further 10 – 15 hours at room temperature. The reaction product which has separated out is filtered off on a sintered glass filter and washed with 300 ml of monohydrate. The filter residue (540 g) is divided into 2 equal parts by weight.

Part 1: 270 g of the press cake are stirred with 250 ml of cold 20 percent strength oleum and the mixture is then warmed to 60° – 65°C over the course of 15 minutes and kept at this temperature for 1 hour. It is filtered on a frit and the residue is rinsed with 80 parts by volume of 10 percent strength oleum and 40 parts by volume of anhydrous sulphuric acid and thoroughly pressed out. The residue is now washed on the frit, initially with cold water and subsequently with hot water, until neutral and is dried at 100°C. 57.7 g of 1,5-dinitro-anthraquinone are obtained. Analysis: 88 percent strength, containing 12 percent of 1,8-dinitro-anthraquinone. Yield of pure 1,5-dinitro-anthraquinone: 50.8 g. The filtrate (= 770 parts by weight) is treated with 90 parts of water at 80° → 100°C over the course of one-half hour, stirred until it has cooled to 80°C and filtered at 80°C, and the residue is washed with 80 g of 90 percent strength cold sulphuric acid and finally with water until neutral, and is dried. 35.6 g of 1,8-dinitro-anthraquinone are obtained. Analysis: 84 percent strength, with 14 percent of 1,5-dinitro-anthraquinone. Yield of pure 1,8-dinitro-anthraquinone: 29.8 g.

Part 2 is stirred into 2,000 g of hot water, further stirred until all lumps have disintegrated and filtered off, and the residue is washed until neutral and dried. 111.5 g of a mixture containing, inter alia, 49 percent of 1,5-dinitro-anthraquinone and 41 percent of 1,8-dinitro-anthraquinone are obtained. Pure yield of 1,5- and 1,8-dinitro-anthraquinone: 100.5 g. Pure yield of 1,5- and 1,8-dinitro-anthraquinone in Part 1: 92.6 g, representing 92.5 percent of the material introduced; loss as a result of the separation: 7.5 percent.

EXAMPLE 2

100 g of the dry mixture of 1,5- and 1,8-dinitro-anthraquinone obtained according to Example 1 from Part 2 are stirred with 500 ml of cold 10 percent strength oleum for 15 hours and the mixture is then heated to 50° – 55°C and stirred for a further hour at the same temperature. The product is filtered off on a frit and rinsed with 100 ml of 10 percent strength cold oleum and finally with 50 ml of anhydrous sulphuric acid. The residue is washed with water on the frit until neutral and is dried at 100°C. 49.5 g of 1,5-dinitro-anthraquinone are obtained. Strength 87 percent, contaminated with 12 percent of 1,8-dinitro-anthraquinone. The filtrate = 1,125 g is diluted with 100 g of water at 80° – 100°C and stirred for 15 hours until cold and the product is filtered off, washed with 80 ml of 90 percent strength $H_2SO_4$, washed with hot water until neutral and dried. 35.2 g of 1,8-dinitro-anthraquinone. Quality, 85 percent strength, with 14 percent of 1,5-dinitro-anthraquinone.

The two fractions contain 83.85 g of 1,5- and 1,8-dinitro-anthraquinone, that is to say 93.2 percent of the material employed. Loss due to separation: 6.8 percent.

EXAMPLE 3

If the isolation of the 1,5-dinitro-anthraquinone is carried out as described in Example 2 but the filtrate is only diluted with 60 g of water and only stirred until it has cooled to 30°C (which requires approx. 50 minutes) and the mixture is in other respects worked-up as described in Example 2, only 28 g of 1,8-dinitro-anthraquinone, of distinctly better quality (91 percent strength, with 8 percent of 1,5-dinitro-anthraquinone) are obtained. The loss due to separation is now 13.8 percent.

EXAMPLE 4

300 g of anthraquinone are dissolved in 625 ml of 20 percent strength oleum and stirring is continued until all the material has dissolved. 400 ml of an anhydrous nitrating acid containing 33 percent of nitric acid are then added dropwise at a uniform speed over the course of 3 hours. The mixture is then heated to 95°C over the course of 2 hours and is kept at this temperature for a further 2 hours. It is stirred until it has cooled to 50°C, 420 ml of 65 percent strength oleum are rapidly added, the mixture is stirred for a further hour at 60° – 65°C and filtered on a prewarmed frit, and the residue is washed with 220 ml of 10 percent strength cold oleum and finally with 110 ml of anhydrous $H_2SO_4$. The residue is washed with water until neutral and dried. 156 g of 1,5-dinitro-anthraquinone are obtained. Quality: 82 percent strength, with 16 percent of 1,8-dinitro-anthraquinone.

The filtrate = 3,250 g is divided into 2 equal parts: part A is treated with 90 g of water and the product filtered off at 80°C and washed with 100 ml of 90 percent strength sulphuric acid. After washing with water and drying, 23.5 g of 1,8-dinitro-anthraquinone are obtained. Quality: 90 percent strength, with 8.8 percent of 1,5-dinitro-anthraquinone. Part B is worked-up like part A, but treated with 210 g of water. Yield: 53.5 g of 1,8-dinitro-anthraquinone. Quality: 71 percent strength, with 13 percent of 1,5-dinitro-anthraquinone.

EXAMPLE 5

100 g of anthraquinone are dissolved in 400 ml of 20 percent strength oleum and a total of 134 ml of an anhydrous nitrating acid containing 33 percent of nitric acid is added over the course of 3 hours. After addition of about 50 percent of this mixed acid, 53 ml of 65 percent strength oleum are added, whereupon the temperature rises to 75° – 80°C. The mixture is stirred for a further 15 hours at room temperature and is then stirred for 2 hours at 60° – 65°C, finally for 6 hours at 70° – 75°C, and filtered on a prewarmed frit at 70°C, and the residue is washed with 100 ml of 10 percent strength oleum and finally with 40 ml of anhydrous $H_2SO_4$. 44.8 g of 1,5-dinitro-anthraquinone are obtained, quality 85 percent strength, with 15 percent of 1,8-dinitro-anthraquinone.

The filtrate = 1,315 g, after dilution with 60 g of water and filtration whilst cold, yields 23.4 g of 1,8-dinitro-anthraquinone.

EXAMPLE 6

The procedure described in Example 5 is followed but the 65 percent strength oleum is already added at the beginning of the reaction. The nitration takes place distinctly more slowly than in the procedure of Example 5; the mixture is further stirred at 75° – 80°C until only a little anthraquinone and 1-nitro-anthraquinone is still detectable and is worked up as described in Example 5. 42.3 g of 1,5-dinitro-anthraquinone (quality: 82 percent strength, with 15 percent of 1,8-dinitro-anthraquinone) and 22 g of 1,8-dinitro-anthraquinone (quality: 93 percent strength, with 4.3 percent of 1,5-dinitro-anthraquinone) are obtained.

EXAMPLE 7

10 g of a finely ground mixture consisting of 52.5 percent of 1,5-dinitro-anthraquinone, 42.2 percent of 1,8-dinitro-anthraquinone, 0.9 percent of 1-nitro-anthraquinone and 3.9 percent of 1,6- and 1,7-dinitro-anthraquinone (manufactured by mixing 99 percent strength 1,5-dinitro-anthraquinone and a 1,8-dinitro-anthraquinone which is contaminated by 1-, 1,6- and 1,7-dinitro-anthraquinone and with 2.7 percent of 1,5-dinitro-anthraquinone) are stirred with 50 ml of cold 15 percent strength oleum for 15 hours, filtered off on a frit, washed with 15 ml of anhydrous sulphuric acid, washed with water until neutral and dried. 4.65 g of 1,5-dinitro-anthraquinone are obtained. Quality: 98.7 percent strength, with 0.6 percent of 1,8-dinitro-anthraquinone and 0.35 percent of 1-nitro-anthraquinone. Yield of pure 1,5-dinitro-anthraquinone: 88 percent of the material employed.

Dilution of the filtrate to 80 percent strength acid yields 5 g of impure 1,8-dinitro-anthraquinone which inter alia contains 9.8 percent of 1,5-dinitro-anthraquinone.

EXAMPLE 8

100 g of anthraquinone are dissolved in 300 ml of 20 percent strength oleum, 146 ml of an anhydrous nitrating acid containing 33 percent of nitric acid are added at a uniform speed over the course of 3 hours and the reaction mixture is heated to 80° – 85°C over the course of 1 hour and kept at this temperature for 2 hours. No further anthraquinone is now detectable chromatographically. 120 ml of 65 percent strength oleum are added at 70° – 80°C and the product is filtered off at 65°C, washed with 75 ml of 10 percent strength oleum, washed until neutral and dried. 45.6 g of 1,5-dinitro-anthraquinone are obtained. Quality: 87 percent strength, containing 12 percent of 1,8-dinitro-anthraquinone.

We claim:

1. Process for the manufacture of 1,5-dinitro-anthraquinone and 1,8-dinitro-anthraquinone of a degree of purity of at least 80 percent by nitration of anthraquinone in sulphuric acid and subsequent isolation from the reaction mixture, characterized in that the nitration mixture is adjusted to an $SO_3$ content of 8–20 percent, the undissolved 1,5-dintro-anthraquinone is separated off and the 1,8-dinitro-anthraquinone is separated out from the mother liquor by adjusting it to a sulphuric acid concentration of about 80–100 percent.

2. Process for the manufacture of 1,5-dinitro-anthraquinone of a degree of purity of least 80 percent, which contains 1,8-dinitro-anthraquinone as the significant impurity and which is practically free of 1,6- and 1,7-dinitro-anthraquinone, characterized in that a sulphuric acid-anthraquinone nitration mixture is adjusted to an $SO_3$ content of 8–20 percent and the undissolved 1,5-dinitro-anthraquinone is subsequently separated off.

3. Process for the manufacture of 1,8-dinitro-anthraquinone by nitration of an anthraquinone in sulphuric acid, characterized in that the nitration mixture is adjusted to an $SO_3$ content of 10–17 percent, the insoluble 1,5-dinitro-anthraquinone is separated off, the mother liquor is diluted to a sulphuric acid content of about 92–100 percent, and the 1,8-dinitro-anthraquinone which thereupon precipitates is separated off.

4. Process for separating a mixture, consisting essentially of 1,5-dinitro-anthraquinone and 1,8-dinitro-anthraquinone, into 1,5-dinitro-anthraquinone and 1,8-dinitro-anthraquinone, characterized in that the mixture is treated with sulphuric acid having an $SO_3$ content of 10–17 percent, the insoluble 1,5-dinitro-anthraquinone is separated off, the mother liquor is diluted to a sulphuric acid content of about 80–100 percent, and the 1,8-dinitro-anthraquinone which thereupon precipitates is separated off.

* * * * *